UNITED STATES PATENT OFFICE.

ANTON BONATI, OF BIEBRICH, GERMANY, ASSIGNOR TO THE FIRM OF KALLE AND COMPANY, OF BIEBRICH, GERMANY.

SULFUR DYE AND PROCESS OF MAKING SAME.

SPECIFICATION forming part of Letters Patent No. 695,533, dated March 18, 1902.

Application filed January 8, 1902. Serial No. 88,906. (No specimens.)

*To all whom it may concern:*

Be it known that I, ANTON BONATI, a subject of the King of Prussia, Emperor of Germany, residing at Biebrich, Germany, have invented certain new and useful Improvements in Cotton Dyes Containing Sulfur and the Process of Making the Same, of which the following is a specification.

When boiled with carbon bisulfid, the partial-reduction product of ortho-para-dinitro-para (1)-hydroxy-diphenylamin—namely, para-nitro-ortho-amido-para (1)-hydroxydiphenylamin

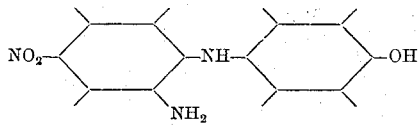

yields a condensation product having the character of a thiocarbamid. It is scarcely soluble in petroleum, benzene, or chloroform, but dissolves freely in boiling alcohol and acetone. It is somewhat soluble in hot glacial acetic acid and separates on cooling in small crystals, which melt at a temperature above 280° centigrade. The substance can also be obtained in crystals from dilute alcohol. When this thiocarbamid-like condensation product is fused with sodium sulfid and sulfur, a coloring-matter is produced which contains sulfur and which dyes cotton grayish blue in an alkaline bath containing sodium sulfid. On subsequent treatment with an oxidizing agent—such, for example, as hydrogen peroxid—or on exposure to air the shade becomes pure blue and can be considerably intensified without undergoing other alteration by further treatment with a metallic salt—such, for example, as tetrachlorid of tin.

The following will explain how the new matters according to this invention can be prepared.

24.3 kilograms of nitroamido-para-hydroxy-diphenylamin are dissolved in two hundred liters of alcohol and heated for ten hours in a reflux apparatus with fifteen kilograms of carbon bisulfid, and when cold the liquid is filtered and the residue washed with alcohol. Five kilograms of this compound are then added gradually to a melt of forty kilograms of sodium sulfid and sixteen kilograms of sulfur in an oil-bath at a temperature of from 110° to 115° centigrade, and as soon as the melt is viscous it is dried by heating it in an oven for about three hours at a temperature of 145° centigrade. The dried product can be used directly for dyeing. It dissolves in water with a greenish-blue color, changing to blue on addition of sodium sulfid. On boiling a solution with sodium sulfid the color changes to light green, but turns again deep blue on exposure to the air. An addition of common salt to an aqueous solution of the coloring-matter causes a precipitate. On addition of dilute acids the dyestuff, together with sulfur, is precipitated as a light-yellow substance.

Concentrated sulfuric acid dissolves the new dyestuff with a green-blue color.

Now what I claim is—

1. The herein-described process of making a substantive cotton-dye containing sulfur, which consists in boiling the partial-reduction product of ortho-para-dinitro-para-oxy-diphenylamin with carbon bisulfid, and melting the so-obtained condensation product, having the character of a thiocarbamid, together with sodium sulfid and sulfur at an elevated temperature.

2. As a new product the dyestuff obtainable by melting the condensation product of nitro-amido-para-oxydiphenylamin and carbon bi-sulfid together with sodium sulfid and sulfur, soluble in water with greenish-blue color, changing to blue by addition of sodium sulfid and to light green on subsequent boiling, dyeing unmordanted cotton a grayish-green shade which is developed to greenish blue by a subsequent treatment with hydrogen peroxid and stannic chlorid.

In testimony whereof I have signed my name to this specification in the presence of two subscribing witnesses.

ANTON BONATI.

Witnesses:
JEAN GRUND,
IGNAT ROSENBERG.